June 20, 1933.  J. E. ELMS  1,914,737

VALVE

Filed June 29, 1931

Inventor
John E. Elms

Jack A. Ashley
Attorney

Patented June 20, 1933

1,914,737

UNITED STATES PATENT OFFICE

JOHN E. ELMS, OF DALLAS, TEXAS, ASSIGNOR TO ARTHUR R. THOMASSON, OF DALLAS, TEXAS

VALVE

Application filed June 29, 1931. Serial No. 547,600.

This invention relates to new and useful improvements in valves.

One object of the invention is to provide a valve having an improved form of valve seat packing making for more perfect seating and longevity of the parts.

A particular object of the invention is to provide an improved packing ring or insert having its working surface lying substantially flush with the upper surface of the valve seat so that the impact resulting from the closing of the valve is sustained by the seat rather than by the ring, thus preventing injury to the ring and preventing leaking.

A further object of the invention is to provide a packing ring having its outer periphery shaped and so exposed to the fluid pressure as to seal against the valve and the valve seat when subjected to such pressure, thus providing an efficient packing and preventing the passage of fluids.

Another object of the invention is to provide a packing ring of such material and construction as to prevent obstructions embedding themselves therein, as well as providing a positive cutoff and thus eliminating excessive wear or channelling of the valve seat by leaking fluids.

A further object of the invention is to provide a packing ring having a circumferential groove in its outer periphery so as to expose the upper and lower lip portions to the pressure of the fluid, whereby said portions are forced against the seat and the underside of the valve, thus producing an effectual seal.

An important object of the invention is to provide a packing ring with a peripheral groove and of sufficient diameter to overhang its seat, whereby the fluid pressure in the grooves will displace the lower lip of the ring and cause it to bend downwardly over the outer edge of the seat, thus providing a more effectual seal.

A construction designed to carry out the invention will be hereinafter described together with other features of the invention.

Figure 1:
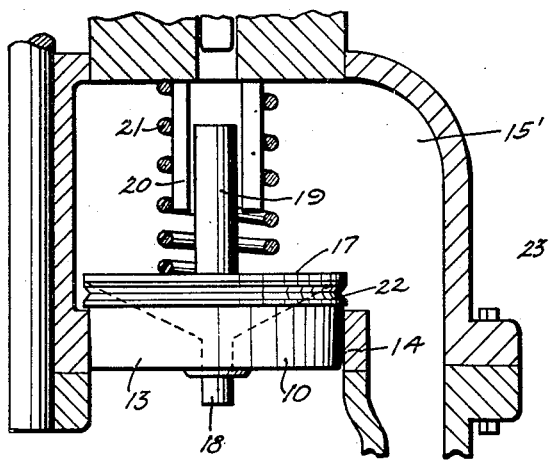
Figure 3:
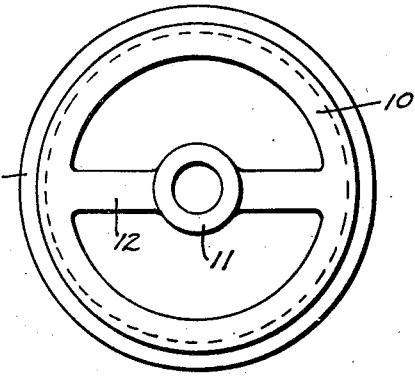
Figure 2:
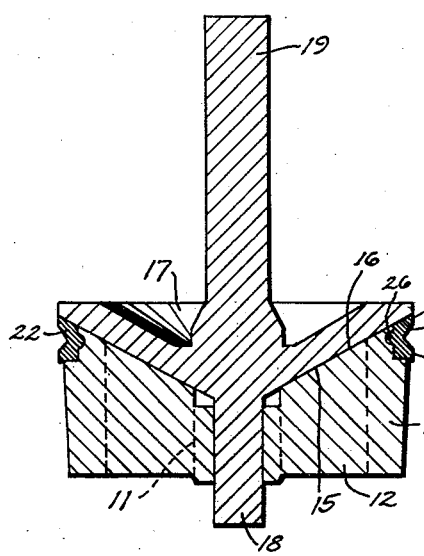
Figure 4:
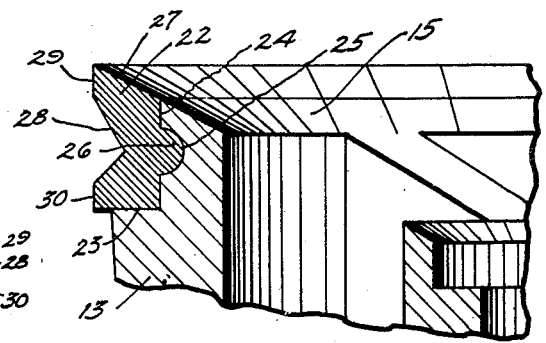
Figure 5:
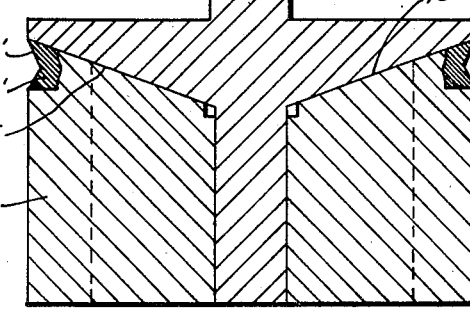

The invention will be more readily understood from a reading of the following specification and by reference to the accompanying drawing in which an example of the invention is shown, and wherein:

Figure 1 is a partial vertical sectional view of a valve chamber for a pressure fluid equipped with a valve and valve seat constructed in accordance with the invention, Figure 2 is a vertical sectional view of the valve and valve seat, Figure 3 is a plan view of the valve seat, Figure 4 is an enlarged sectional view of the packing ring and a portion of the valve seat, and Figure 5 is a sectional view of a modified form of the invention.

This application is filed as a continuation in part of my co-pending application filed January 17, 1930, Serial No. 421,539.

In the drawing the numeral 10 designates an annular valve seat spider having a central guide collar 11 and radial arms 12. The spider also includes an annular apron 13, which is fitted snugly in the aperture 14 of the fluid pressure chambers 15'. The upper surfaces of the arms 12, apron 13 and collar 11 are dished to form an individually inclined valve seat 15 which is ground and accurately finished to receive the conical surface of an annular valve 17. The valve seat and the under surface of the valve are so finished as to form a fluid-tight seat when the valve is closed, thus preventing the passage of fluids therebetween.

The valve has a depending cylindrical guide 18 having a sliding fit in the collar 11. A cylindrical stem 19 extends upwardly from the center of the valve and engages in a guide collar 20 in the chamber 15'. A coiled spring 21 surrounding the collar 20 bears on top of the valve and acts to seat the latter.

One of the important features of the invention resides in an annular packing ring 22 which rests upon a horizontal shoulder 23 provided in the rim of the apron. The apron has an annular upright wall 24 extending from the inner edge of the shoulder to the inclined seat 15. This wall has an annular concaved groove 25 about mid-height and the ring 22 is formed with an annular bead 26 on its inner periphery. The inner flat periphery of the ring engages the wall while the bead engages in the groove. By this arrangement the ring is held against upward displacement.

The packing 22 is preferably made of rubber, rubber compound or other material suitable for the purpose. The advantage of using such material is that its tensile strength and resiliency will prevent small bits of gravel, sand and other obstructions embedding themselves therein and thus holding the valve open.

The upper surface or face 27 of the ring is inclined at the same angle as the valve seat 15 and is substantially flush therewith so as to contact with the surface 16 of the valve contiguous to the annular edge of the latter. The outer periphery of the packing ring is provided with a V-shaped groove 28 which provides an annular lip 29 at the upper edge of the ring and an annular lip 30 at the lower edge of said ring. It will be noted that the groove 28 is V-shaped in cross-section. This provides pressure surfaces which diverge. Pressure against the upper surface of the groove tends to force the upper lip 29 into contact with the undersurface 16 of the valve; while fluid pressure against the lower surface of the groove tends to force the lip 30 down onto the shoulder 23. These opposite pressures act to seal the ring against the seat and the valve when the valve is seated.

The ring is given an outer diameter slightly greater than that of the apron 13 so that its lip 30 will overhang the outer edge of the shoulder 23. As the bottom inclined surface of the groove 28 presents a greater area than the underside of the exposed portion of the lip 30, the pressure will cause said lip to bend or distort downwardly over said edge and thus form a more effectual seal between the ring and the shoulder. This is a very important feature.

It is pointed out that when the valve 17 is closed its surface 16 is sustained by the valve seat 15 which also carries the impact of the closing action. The packing ring 22 is thus not subjected to pounding or injury by the closing of the valve, which would occur if the ring protruded above said seat.

In Figure 5 I have shown a modified form in which the ring 22' has a peripheral groove 28'. This groove is V-shaped in cross-section and the upper and lower surfaces extend to the extreme outer upper and lower edges of the ring, thus forming very flexible upper and lower lips 29' and 30'. This form depends upon the divergent fluid pressures to seal the lips against the valve and the seat.

It will be noted that in each of the modifications shown the minimum thickness of the ring from the inner diameter of the groove to the diameter of the inner periphery of the ring is not less than the depth of the groove. In this manner sufficient body is afforded the ring in order to insure a proper seal. Moreover, the ring will wear well and will not cut out, as would be the case if a ring without sufficient body were employed.

Having illustrated and described preferred forms of the invention, what I claim, is:

1. In a device of the character described, a valve, a valve seat having an inclined surface, a packing ring disposed between the valve and the valve seat and having a groove in its outer periphery and an annular projection on its inner periphery, one of the surfaces of the ring normally inclining downwardly from the outer periphery to the inner periphery at the same angle as the valve seat.

2. A resilient packing ring for valves having an annular groove in its outer periphery forming upper and lower flexible lips, said ring having its upper surface inclined, and an annular retaining bead on the inner periphery of said ring, the thickness of the ring from the inner diameter of the groove to the inner periphery of the ring being not substantially less than the depth of the groove.

3. The combination with a valve seat having an annular peripheral recess, of a resilient packing ring engaged in said seat recess and having flexible upper and lower lips, the lower lip overhanging the edge of the seat so as to be bent thereover when under pressure.

4. The combination set forth in claim 3, and means on the ring engaging the seat for securing said ring against upward displacement therefrom.

5. In a device of the character described, a valve, a valve seat, a resilient packing ring disposed between the valve and valve seat having a groove in its outer periphery V-shaped in cross-section, whereby said ring is provided with upper and lower annular sealing lips, the minimum thickness of the ring being not substantially less than the depth of the groove.

6. A device as set forth in claim 5, and an annular bead on the inner periphery of the ring.

7. In a device of the character described, a valve seat having an annular shoulder and an upright wall rising from the shoulder, the seat having an inclined valve receiving surface above the wall, an elastic packing ring resting on said shoulder and secured to said wall, the upper surface of the ring normally conforming to the inclined surface of the seat and inclined at the same angle, the outer periphery of the ring having an annular groove providing upper and lower flexible lips.

8. A device as set forth in claim 7, with the lower lip of the ring overhanging the edge of the shoulder.

9. A device as set forth in claim 7, in which the ring has a bead and the wall has a groove receiving the bead which constitutes the means for securing the ring to the wall.

10. In a device of the character described, a valve, a valve seat, a resilient packing ring disposed between the valve and valve seat having an annular groove in its outer periphery, the margins of which form upper and lower flexible lips, the upper surface of the ring being inclined downwardly from the upper lip, and the minimum thickness of the ring being not substantially less than the depth of the groove.

In testimony whereof I affix my signature.

JOHN E. ELMS.